Figure 1:
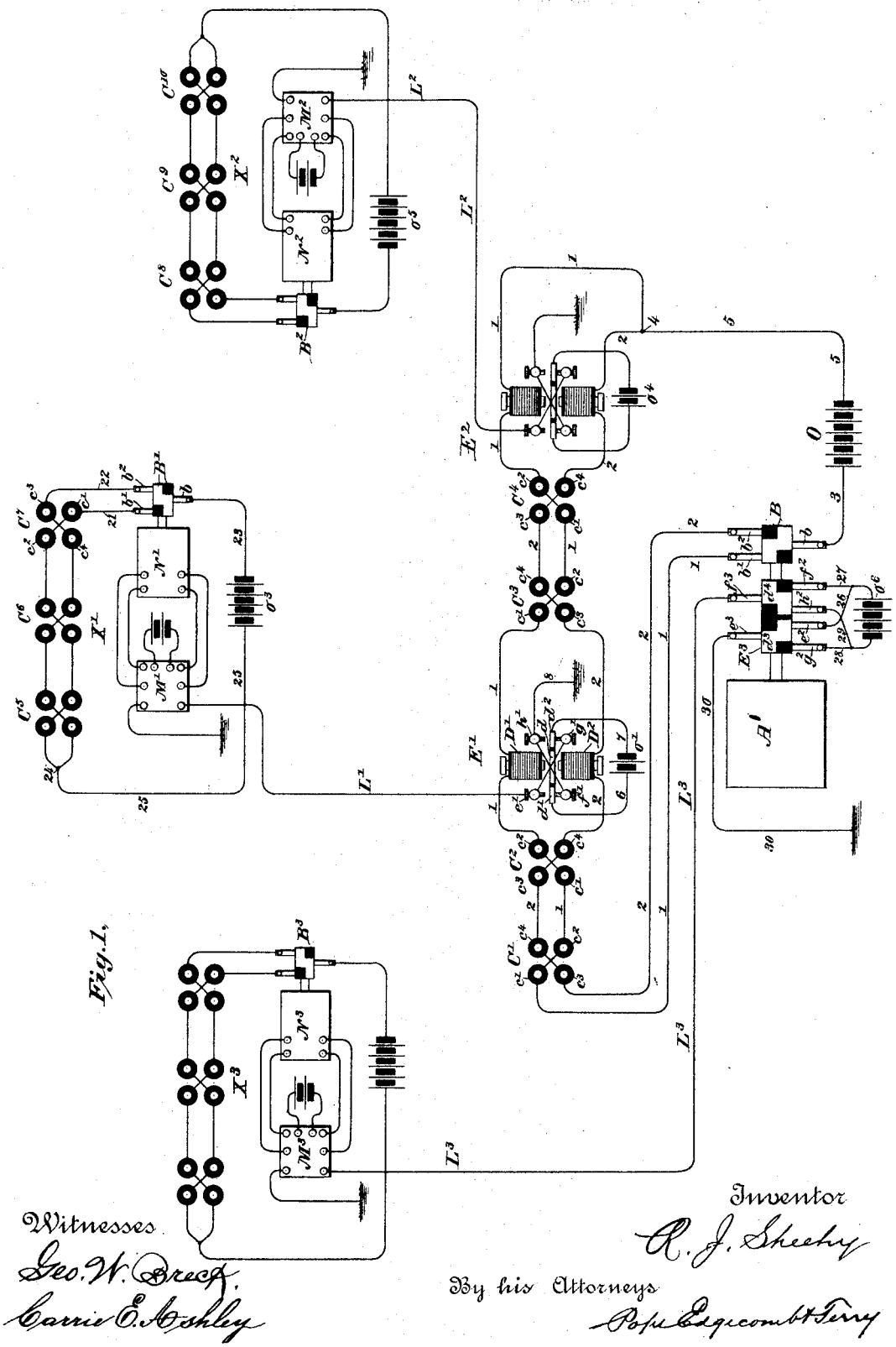

(No Model.) 2 Sheets—Sheet 1.

R. J. SHEEHY.
APPARATUS FOR SECURING SYNCHRONOUS MOVEMENT.

No. 506,271. Patented Oct. 10, 1893.

Witnesses
Geo. W. Breck
Carrie E. Ashley

Inventor
R. J. Sheehy
By his Attorneys
Pope Edgecomb & Ferry

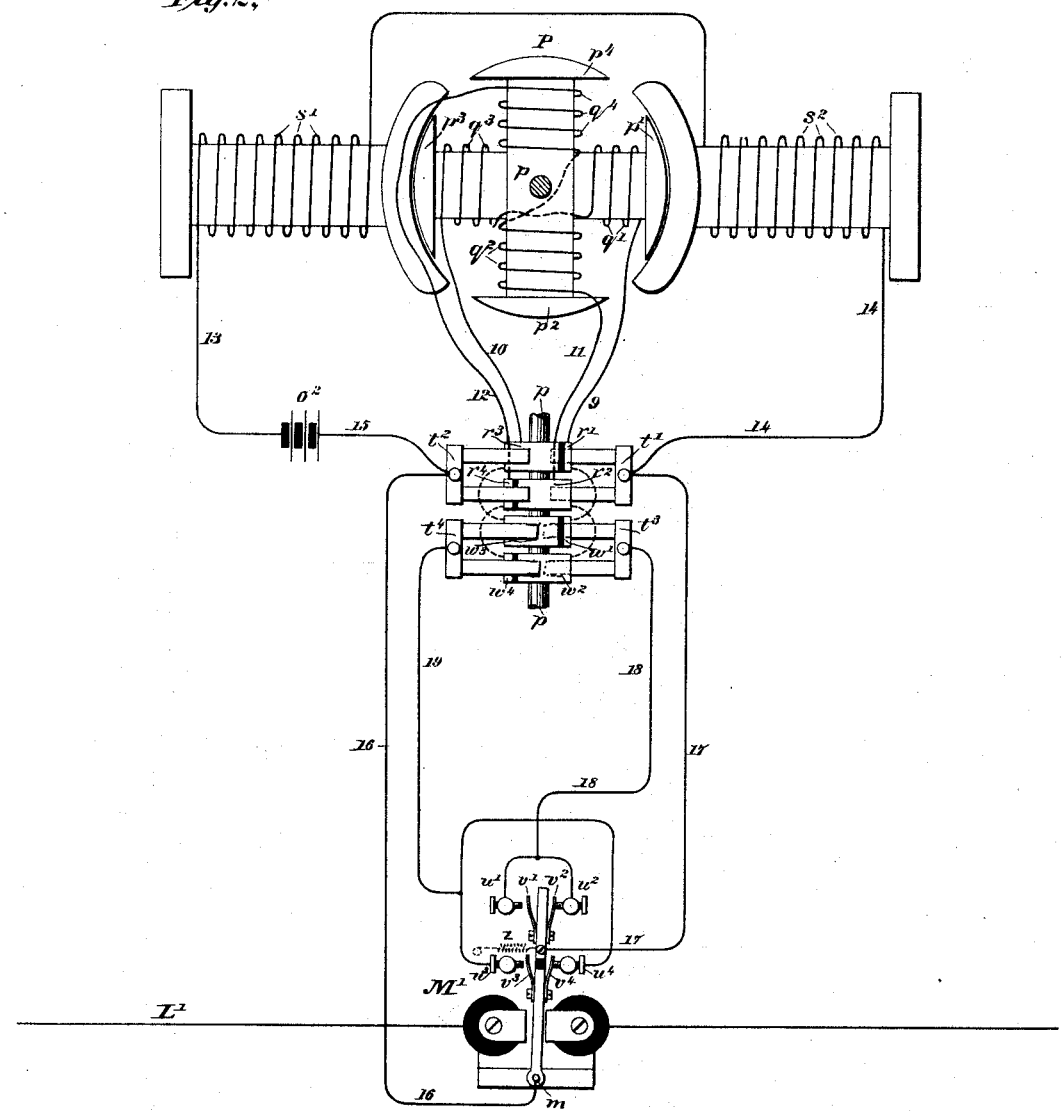

UNITED STATES PATENT OFFICE.

ROBERT J. SHEEHY, OF NEW YORK, N. Y., ASSIGNOR, BY MESNE ASSIGNMENTS, TO WENDELL GOODWIN, OF SAME PLACE.

APPARATUS FOR SECURING SYNCHRONOUS MOVEMENT.

SPECIFICATION forming part of Letters Patent No. 506,271, dated October 10, 1893.

Application filed December 31, 1887. Renewed March 15, 1893. Serial No. 466,171. (No model.)

*To all whom it may concern:*

Be it known that I, ROBERT J. SHEEHY, a citizen of the United States, residing in New York, in the county and State of New York, have invented certain new and useful Improvements in Apparatus for securing Synchronous Movements, (Case D,) of which the following is a specification.

The invention relates to an organization of electric circuits and apparatus for maintaining synchronism or unison in the movements of apparatus located at different points.

The general plan of the invention is to drive independent electric motors located at different points, by electric currents derived from independent sources of electricity, and to control their operations by means of electric impulses sent over lines leading thereto from any given central point. The controlling impulses are transmitted synchronously by suitable apparatus over different lines or branch conductors leading to the controlled devices. The impulses thus sent operate speed-controlling devices such for instance as polarized relays, which are organized to slightly delay the changes in the circuit-connections of the motors, in case the motors tend to run too fast, and to insure that these changes shall be synchronous in all the motors. The motors which are thus controlled may be employed for driving other motors, printing telegraphs, automatic or other forms of telegraphic apparatus, whose rates of movement will be synchronous with each other.

In the accompanying drawings, Figure 1 is a diagram showing a general organization of apparatus for carrying out the invention, and Fig. 2 is a detail illustrating one of the controlled motors.

Referring to the figures, A' represents a suitable source of power operating at a required speed. This may be a mechanical or an electric-motor. Upon its shaft there is carried a circuit-controller or transmitter B. This operates to send impulses from a battery O alternately through two different conductors 1 and 2. For this purpose one pole of the battery is connected by a conductor 3 with a brush $b$ which at all times makes contact with the metal of the circuit-controlling device B. Two other brushes $b'$ and $b^2$ make contact with this metal alternately, and therefore continue the circuit from the conductor 3 alternately through the conductors 1 and 2 with which the brushes are respectively connected.

The conductor 1 is connected through alternate magnets $c'$ and $c^2$, of motors $C'$, $C^2$, $C^3$ and $C^4$, of any suitable construction, such for instance, as described in patent issued to me May 29, 1887, No. 191,478. The conductor 2 is connected through the other magnets $c^3$ and $c^4$ of the respective motors, and the two conductors 1 and 2 are united at a point 4 with a conductor 5 leading to the remaining pole of the battery O. In this manner the motors $C'$, $C^2$, $C^3$ and $C^4$ will operate in unison with each other.

In the conductor 1 there is included an electro-magnet $D'$, and a corresponding magnet $D^2$ is included in the conductor 2. These two magnets together with their armature $d$ and its contact points $e'$, $f'$, $g'$, $h'$, constitute a relay $E'$ which is also a circuit controller or transmitter for the line $L'$. The armature $d$ is driven to and fro by the currents alternately transmitted through the conductors 1 and 2. The two insulated circuit-closing points $d'$ and $d^2$ carried by the armature, play between the contact points $e'$ and $f'$, and $g'$ and $h'$ respectively. The two circuit-closing points are respectively connected by conductors 6 and 7 with the opposite poles of a local battery $o'$. The points $e'$ and $g'$ are connected with each other and with a conductor $L'$ leading to a station $X'$. The points $f'$ and $h'$ are connected with each other and by conductor 8 with the earth. Impulses will thus be sent over the line $L'$ in alternate directions from the battery $O'$, at a frequency dependent upon the movements of the armature.

At the station $X'$ there is placed a polarized relay $M'$, such as is shown in detail in Fig. 2. This is employed for controlling the speed of the motor $N'$. The motor here shown consists of an armature P having four poles $p'$, $p^2$, $p^3$ and $p^4$. These are provided with magnetizing coils $q'$, $q^2$, $q^3$ and $q^4$. The coils $q'$ and $q^3$ are connected in series, and by conductors 9 and 10 respectively with the plates $r'$, $r^3$ of a commutator carried upon the shaft $p$ of the armature. The coils $q^2$, $q^4$, are likewise connected in series and by conductors 11 and 12 with the plates $r^2$ and $r^4$, of the commutator. A battery $o^2$ is connected by a conductor 13 through the field-magnet coils $s'$ and $s^2$ of the motor, and by a conductor 14 with the contact brush $t'$ applied to the commutator. The other pole of the battery is connected, by a conductor 15, with the brush $t^2$ of the commutator. The positions of the brushes are such as to cause the motor-armature to revolve, when the circuit of the battery is closed, in a manner well understood.

It is now desired to render the movements of the armature synchronous with the movements of the apparatus at the central station and at other stations such as shown at $X^2$. It is evident that should the motor incline to run too rapidly and means were provided for delaying the moment at which the brushes $t'$ and $t^2$ should change from the plates $r^3$ and $r^2$ to the plates $r'$ and $r^4$ and vice versa, or if the current is continued through one set of armature coils after the normal connections through the other have been completed, then the motor would slacken its speed. This is accomplished by means of the supplemental brushes $t^3$ and $t^4$, which are organized and connected in such manner that, under the control of the polarized relay $M'$, they will practically prolong the connections at any time made by the brushes $t'$ and $t^2$, provided the armature of the relay does not move from one of its resting points to the other at the same instant that the brushes $t'$ and $t^2$ change their commutating points. For this purpose a conductor 16 leads from the conductor 15 or brush $t^2$ to the armature $m$ of the relay. A conductor 17 leads from the conductor 14 or brush $t'$ to two insulated contact-springs $v'$ and $v^2$ carried upon the lever. These springs play between contact-points $u'$ and $u^2$. The parts are so organized that a slight interval after contact with one point is broken intervenes before the other is made. A conductor 18 connects the points $u'$ and $u^2$ with the brush $t^3$ applied to the commutator plates $w'$, $w^3$, $w^2$, $w^4$. A conductor 19 connects the brush $t^4$ with the contact-points $u^3$ and $u^4$ applied to contact springs $v^3$ and $v^4$ carried upon the lever $m$ and in electrical connection therewith. The plates $w'$ and $r'$ are connected with each other and likewise the plates $w^3$ and $r^3$, $w^2$ and $r^2$, and $w^4$ and $r^4$. The brushes $t^3$ and $t^4$ are so placed, with reference to each other and the brushes $t'$ and $t^2$, that they will pass from the corresponding contact-plates after the brushes $t'$ and $t^2$ have changed their contacts with the alternating plates, therefore if the circuit through the conductors 18 and 19 is closed in a given direction while the current is circulating through the brushes $t'$ and $t^2$ and the corresponding coils of the armature, and after these brushes change their commutating points, the connections of the conductors 18 and 19 remain for a moment unchanged; then the current will be divided between the four coils of the armature, and therefore the tendency to revolve will be lessened; but the moment the armature-lever $m$ is removed from such position and thrown toward the other contact-points, the prolongation will be momentarily interrupted, and the motor will move forward under the influence of the current through the one set of coils only. This momentary interruption which is the element serving to control the operation, is determined by the movements of the lever $m$ and therefore by the currents transmitted over the line $L'$ and therefore the motor will revolve in synchronism with the devices at the central station, and with other devices similarly controlled.

The polarized relay and its commutator connections constitute a speed controller for regulating the motor.

Motor devices $C^5$, $C^6$, and $C^7$, are included in the circuit of a battery $o^3$, one pole of which is connected by a conductor 23 with the commutator-brush $b$ of a commutator-device $B'$ which is similar to the device $B$; and two branch-conductors 21 and 22 lead from the brushes $b'$ and $b^2$ of this device, through the magnets $c'$, $c^2$, and $c^3$ and $c^4$, of the motor devices. These conductors, uniting at a point 24, are connected by a conductor 25 with the remaining pole of the battery $o^3$. The commutating device $B'$ is operated by the motor $N'$, and thus the devices $C^5$, $C^6$ and $C^7$ will operate in unison with the devices $C'$, $C^2$, $C^3$, and $C^4$.

A second relay $E^2$ at the central station may be connected in the conductors 1 and 2, and serve to transmit currents from a battery $o^4$ over a line $L^2$ to the station $X^2$, in the same manner as the relay $E'$. The polarized relay $M^2$ and motor $N^2$ are operated at this station in the manner described with reference to station $X'$, and the motor devices $C^8$, $C^9$ and $C^{10}$ are driven by currents from the battery $o^5$ transmitted through the commutator $B^2$.

Another method of obtaining the alternating impulses required is shown in connection with a circuit-controlling device $E^3$ carried upon the shaft of the motor $A'$. In this instance a battery $o^6$ has one pole connected by conductors 26 and 27 with the brushes $e^2$ and $f^2$, and its other pole connected, by conductors 28 and 29, with brushes $g^2$ and $h^2$. These make contact with the insulated contact-surfaces $d^3$ and $d^4$, and through them the respective poles of the battery are alternately placed in connection with the brushes $e^3$ and $f^3$. The former is connected with the earth by a conductor 30 and the latter is connected with a line $L^3$ leading to the station $X^3$.

The organization of the apparatus at the station $X^3$ is generally the same as that already described in connection with the stations $X'$ and $X^2$, and the alternating impulses sent over the line will, it is evident, be synchronous with those sent over the lines L' and L², and therefore the apparatus at this station will operate synchronously with that at the other stations.

The motor-devices C', C², C⁵, C⁶, C⁸, &c., may be employed for operating any desired forms of telegraphic or other electrical apparatus which requires to be moved in unison.

Instead of using a polarized relay at M', its lever may be constructed to move in one direction by means of a spring as indicated in dotted lines at $z$, and in the other direction under the influence of intermittent currents sent over the line L'.

I claim as my invention—

1. In a telegraphic exchange system, the combination, substantially as set forth, of a source of electric currents, a circuit-controller, two branch circuits 1, 2, through which currents are sent alternately by means of said circuit-controller, electrically actuated instruments as C' &c., operated by currents traversing said branch circuits, one or more independent lines L' &c., devices actuated by the currents traversing said branch circuits to send like alternate or intermittent currents over said independent line or lines and electrical apparatus controlled by the currents traversing the independent lines to operate synchronously with the first named instruments.

2. In a system of electric telegraphy, the combination, substantially as set forth, of a source of electricity, branch circuits 1 and 2, a circuit-controller for sending currents from said source alternately through said branch circuits, two or more circuit-controllers as E', E², operated synchronously by the currents traversing such branch circuits, independent main lines L', L², sources of electricity from which alternate or intermittent electric impulses are synchronously sent upon said independent main lines, and electrically controlled or operated instruments regulated to run synchronously by the currents traversing such lines.

3. The combination, substantially as set forth, with electrically operated devices and the circuit in which they are included, of an electric motor controlling said circuit, its commutator and contact-brushes through which the armature connections are changed, other contact brushes and contact-plates normally changing their relations after the first contact brushes and contact-plates, and a speed controller through which the connections of said brushes are made and interrupted with the first-named contact brushes.

4. The combination, substantially as set forth, with electrically operated devices and the circuit in which they are included, of an electric motor, its armature, contact plates with which the terminals of the armature coils are connected, contact brushes therefor, other contact brushes applied to said plates changing their circuit-connections therewith during the revolution of the armature after the first-named contact brushes, and circuit connections between the last named brushes and the first named brushes, and a relay or speed controller operating to periodically interrupt such connections under the influence of electric currents traversing its coils.

5. The combination, substantially as set forth, with electrically operated devices and the circuit in which they are included, of the electric motor, the commutator and its brushes, supplemental brushes applied to the commutator, electrical connections between the supplemental brushes and the first named brushes, and a speed-controller in the circuit that includes both sets of brushes serving to periodically interrupt such connections momentarily.

6. An electric motor having a regulator, consisting of supplemental contact-devices or circuit-closers, operating to prolong the circuit-connections existing at any given time and a speed controller momentarily cutting such devices out of circuit, in combination with electrically operated devices controlled by said motor, substantially as described.

7. The combination with electrically operated devices and the circuit in which they are included, of an electric motor, and its armature shaft, the supplemental brushes $t^3$ and $t^4$, the polarized relay M', the brushes $t'$ and $t^2$, and the circuit-connections between said brushes and the first-named brushes through the polarized relay, substantially as described.

In testimony whereof I have hereunto subscribed my name this 30th day of December, A. D. 1887.

ROBERT J. SHEEHY

Witnesses:
JENNIE P. ASHLEY,
CHARLES A. TERRY.